(12) United States Patent
Manico et al.

(10) Patent No.: US 8,330,830 B2
(45) Date of Patent: Dec. 11, 2012

(54) CAMERA USER INPUT BASED IMAGE VALUE INDEX

(75) Inventors: Joseph A. Manico, Rochester, NY (US); John R. Fredlund, Rochester, NY (US); Elena A. Fedorovskaya, Pittsford, NY (US); Douglas B. Beaudet, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 1161 days.

(21) Appl. No.: 11/403,583

(22) Filed: Apr. 13, 2006

(65) Prior Publication Data
US 2007/0242138 A1  Oct. 18, 2007

(51) Int. Cl.
*H04N 5/76* (2006.01)
*H04N 17/00* (2006.01)
*H04N 5/225* (2006.01)

(52) U.S. Cl. .................. 348/231.3; 348/180; 348/231.2; 348/207.1

(58) Field of Classification Search .................. 348/180, 348/231.3, 231.2, 207.1; 382/103
See application file for complete search history.

(56) References Cited

U.S. PATENT DOCUMENTS

| 4,887,121 | A | 12/1989 | Pritchard |
| 6,573,927 | B2 * | 6/2003 | Parulski et al. ................. 348/32 |
| 6,671,405 | B1 | 12/2003 | Savakis et al. |
| 6,738,494 | B1 * | 5/2004 | Savakis et al. ................ 382/100 |
| 6,993,180 | B2 | 1/2006 | Sun et al. |
| 7,522,194 | B2 * | 4/2009 | Higuchi et al. ............ 348/231.2 |
| 2002/0140843 | A1 | 10/2002 | Tretter et al. |
| 2003/0095197 | A1 * | 5/2003 | Wheeler et al. ............... 348/241 |
| 2003/0103088 | A1 | 6/2003 | Dresti et al. |
| 2003/0128389 | A1 * | 7/2003 | Matraszek et al. ........... 358/1.18 |
| 2004/0075743 | A1 | 4/2004 | Chatani et al. |
| 2004/0101178 | A1 * | 5/2004 | Fedorovskaya et al. ...... 382/128 |
| 2004/0120606 | A1 * | 6/2004 | Fredlund ....................... 382/305 |
| 2004/0174434 | A1 | 9/2004 | Walker et al. |
| 2004/0179719 | A1 | 9/2004 | Chen et al. |
| 2005/0105775 | A1 | 5/2005 | Luo et al. |
| 2005/0147298 | A1 | 7/2005 | Gallagher et al. |
| 2005/0219362 | A1 * | 10/2005 | Garoutte ....................... 348/180 |
| 2006/0012690 | A1 * | 1/2006 | Nakamura et al. ......... 348/231.6 |

(Continued)

FOREIGN PATENT DOCUMENTS

JP  2003044511  2/2003

OTHER PUBLICATIONS

Liu X et al.: "Boosting image classification with LDA-based feature combination for digital photograhic management" Pattern Recognition, Elsevier, Kidlington, GB, vol. 38, No. 6, Jun. 2005, pp. 887-901, XP004777889; ISSN: 0031-3203.

(Continued)

*Primary Examiner* — Nhan T Tran
*Assistant Examiner* — Yih-Sien Kao
(74) *Attorney, Agent, or Firm* — Robert L. Walker; Christopher J. White

(57) ABSTRACT

In an imaging evaluation method, camera, and system, a scene is imaged with a camera. User inputs to the camera are received concurrent with the imaging. The inputs each define a setting of one of a plurality of operational functions of the camera. The inputs are valued to provide a set of input values. An image value index is calculated using the input values.

11 Claims, 7 Drawing Sheets

U.S. PATENT DOCUMENTS

| | | |
|---|---|---|
| 2006/0017820 A1* | 1/2006 | Kim .............................. 348/231.2 |
| 2006/0074771 A1 | 4/2006 | Kim et al. |
| 2006/0103731 A1* | 5/2006 | Pilu et al. ................. 348/207.99 |
| 2006/0251292 A1* | 11/2006 | Gokturk et al. ............... 382/103 |
| 2007/0109598 A1 | 5/2007 | Clark et al. |
| 2007/0157105 A1 | 7/2007 | Owens et al. |

OTHER PUBLICATIONS

Uullas Gargi, Yining Deng, Daniel R. Tretter: "Managing and Searching Personal Photo Collections" HP Laboratories, [online]; Mar. 18, 2002, XP002447775; Palo Alto, USA; Retrieved fromt he Internet: URL: ww.citeseer.org> [etrieved on Aug. 23, 2007].

* cited by examiner

CAMERA USER INPUT BASED IMAGE VALUE INDEX

CROSS REFERENCE TO RELATED APPLICATIONS

Reference is made to commonly assigned, co-pending U.S. patent application Ser. No. 11/403,686 (Publication No. 2007/0263092), entitled: VALUE INDEX FROM INCOMPLETE DATA, filed Apr. 13, 2006, in the names of Elena Fedorovskaya, Serguei Endrikhovski, John R. Fredlund and Joseph A. Manico.

Reference is made to commonly assigned, U.S. patent application Ser. No. 11/403,352, now issued as U.S. Pat. No. 7,742,083, entitled: IN-CAMERA DUD IMAGE MANAGEMENT, filed Apr. 13, 2006, in the names of John R. Fredlund, Joseph A. Manico and Elena Fedorovskaya.

FIELD OF THE INVENTION

The invention relates to digital photography methods, systems, and cameras and more particularly relates to an image value index based upon user inputs to a camera.

BACKGROUND OF THE INVENTION

Digital imaging has vastly increased users' ability to amass very large numbers of still images, video image sequences, and multimedia records combining one or more images and other content. (Still images, video sequences, and multimedia records are referred to collectively herein with the term "image records".) With very large numbers of image records, organization becomes difficult.

Efforts have been made to aid users in organizing and utilizing image records by assigning metadata to individual image records that indicates a metric of expected value to the user. For example, the V-550 digital camera, marketed by Eastman Kodak Company of Rochester, N.Y., includes a user control labeled "Share", which can be actuated by the user to designate a respective image for preferential printing and e-mailing. This approach is useful, but is limited by the metric being binary.

U.S. Patent Publication No. 2003/0128389 A1, filed by Matraszek et al., discloses another measure of image record importance, "affective information", which can take the form of a multi-valued metadata tag. The affective information can be a manual entry or can automatically detect user reactions, including user initiated utilization of a particular image, such as how many times an image was printed or sent to others via e-mail. In either case, affective information is identified with a particular user. This approach is useful, but complex if user reactions are automatically detected. There is also the risk of user reactions being ambiguous.

U.S. Pat. No. 6,671,405 to Savakis et al, discloses another approach, which computes a metric of "emphasis and appeal" of an image, without user intervention. A first metric is based upon a number of factors, which can include: image semantic content (e.g. people, faces); objective features, such as colorfulness and sharpness; and main subject features, such as size of the main subject. A second metric compares the factors relative to other images in a collection. The factors are integrated using a trained reasoning engine. U.S. Patent Publication No. 2004/0075743 is somewhat similar and discloses image sorting of images based upon user-selected parameters of semantic content or objective features in the images. These approaches have the advantage of working from the images themselves and the shortcoming of being computationally intensive.

It would thus be desirable to provide a user value metric that has a low risk of ambiguity and that is not computationally intensive.

SUMMARY OF THE INVENTION

The invention is defined by the claims. The invention, in broader aspects, provides an imaging evaluation method, camera, and system, in which a scene is imaged with a camera. User inputs to the camera are received concurrent with the imaging. The inputs each define a setting of one of a plurality of operational functions of the camera. The inputs are valued to provide a set of input values. An image value index is calculated using the input values.

It is an advantageous effect of the invention that an improved methods, cameras, and systems are provided, in which a user value metric that has a low risk of ambiguity and that is not computationally intensive.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
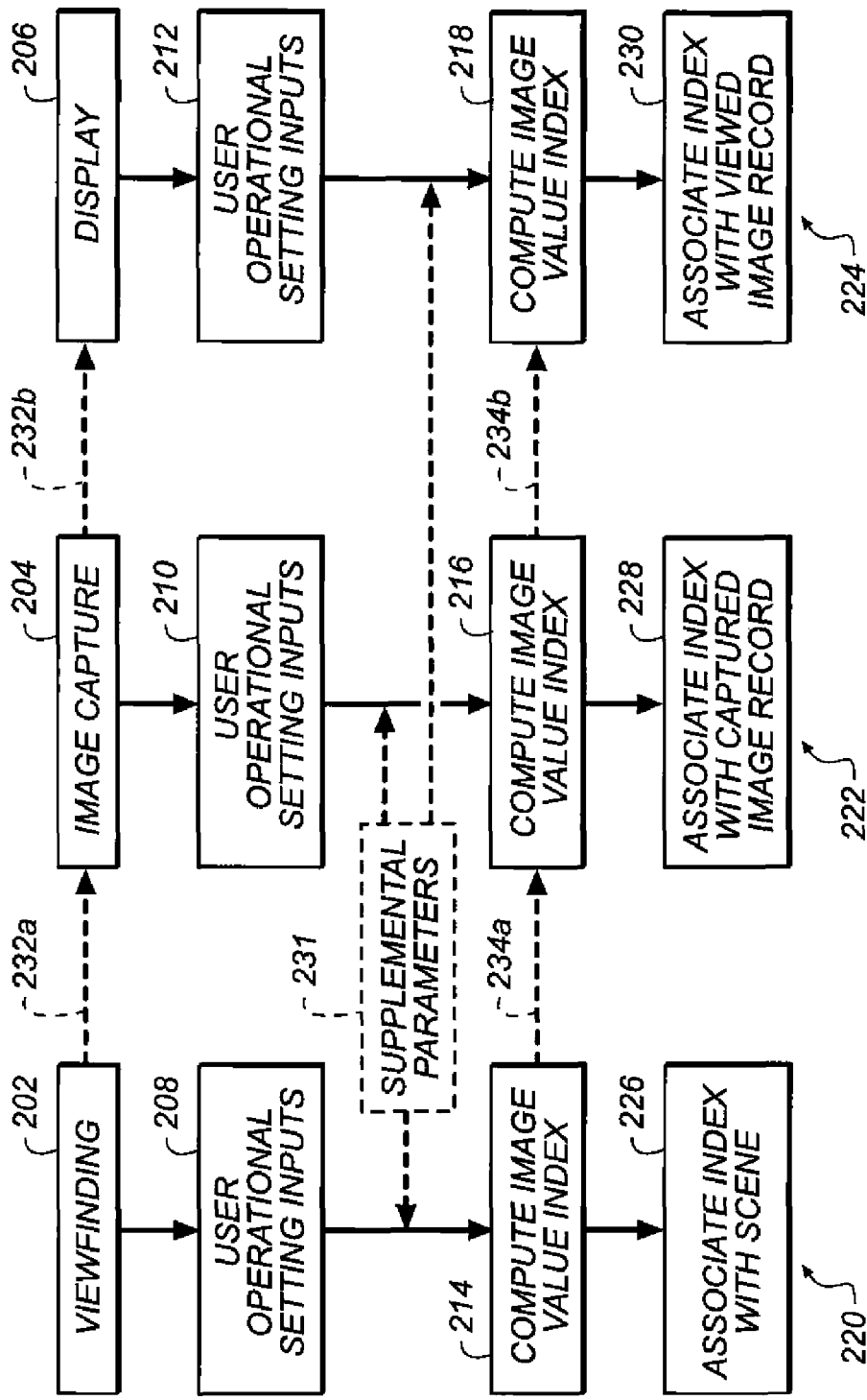
FIG. 1 is a flow diagram of an embodiment of the method.

In the method, user inputs defining operational settings of a camera can be used to derive an image value index of an image record captured with the camera. Supplemental parameters can be determined during the imaging and the image value index modified responsive to those supplemental parameters. After imaging, the image value index remains associated with the image record in a database and during utilization of the image record. The utilization and/or availability of utilization resources can be controlled by the image value index. The image value index can also or alternatively be modified responsive to the utilization.

The verb "image" is used herein to refer to the operation of a camera in forming an image of a scene. The viewfinder images a light image through an eyepiece or the like. Viewfinder imaging is also referred to herein as "viewfinding" an image. The taking lens images a light image onto the image sensor to capture an electronic image. Taking lens to image sensor imaging is also referred to herein as "image capture". A camera can also image an earlier captured scene, by rendering a digital image of that earlier captured scene on a display, which produces a light image of the scene. This display imaging is also referred to herein as "displaying" an image.

The term "archival image" is used herein to refer to a digital image stored in memory and accessible to the user following a capture event. An archival image is distinguished from other non-archival electronic images produced during capture of a light image of a scene. Such non-archival images include earlier images in the imaging chain leading to the archival image, such as the initial analog electronic image captured by the image sensor of the camera and the initial digital image produced by digitizing the initial analog image. In those cases, the non-archival images and the resulting archival image are all produced from the same light image. Another type of non-archival images is images used in viewfinding, setting exposure and focus, and the like. These non-archival images may be shown to the user on a viewfinder or the like, but are not made available for ordinary use subsequent to capture. These non-archival images can be automatically deleted by reuse of the memory used for storing them.

The term "image record" is used here to refer to a digital still image, video sequence, or multimedia record. An image record is inclusive of one or more images in any combination with sounds or other data and is exclusive of any non-archival images. For example, image records include multiple spectrum images, scannerless range images, digital album pages, and multimedia video presentations. Discussion herein is generally directed to image records that are captured using a digital camera. Image records can also be captured using other capture devices and by using photographic film or other means and then digitizing. As discussed herein, image records are stored digitally along with associated information.

The term "date-time" is used here to refer to time related information, such as a date and a time of day; however, a date-time can be limited to a particular unit of time, such as date information without times.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of digital still and video cameras and computerized systems are likewise well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

Figure 8:
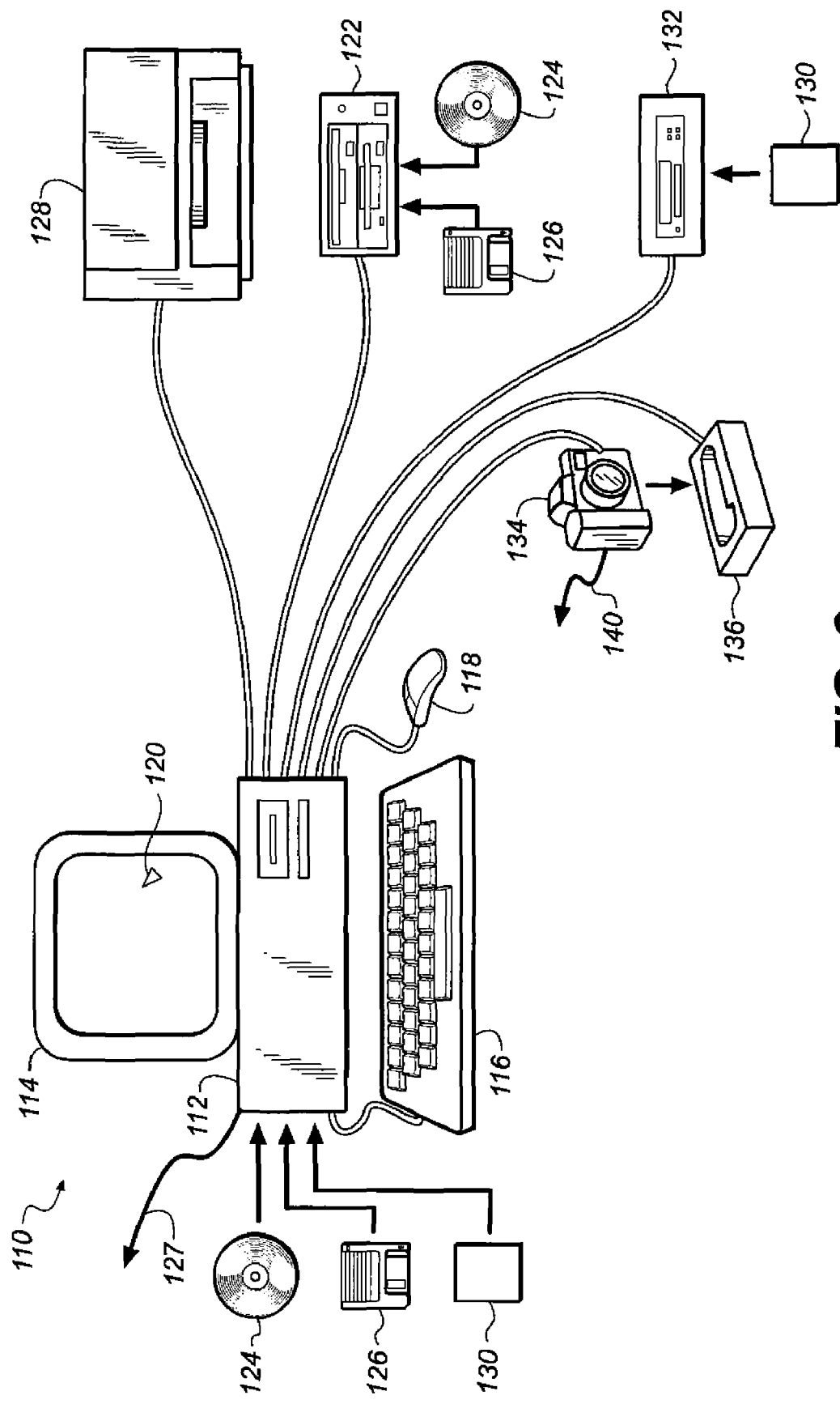
FIG. 8 is a diagrammatical view of an embodiment of the system.

The present invention can be implemented in computer hardware and computerized equipment. For example, the method can be performed using a system including one or more digital cameras or other capture devices and/or one or more personal computers. Referring to FIG. 8, there is illustrated a computer system 110 for implementing the present invention. Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor-based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

Removable memory, in any form, can be included and is illustrated as a compact disk-read only memory (CD-ROM) 124, which can include software programs, is inserted into the microprocessor based unit for providing a means of inputting the software programs and other information to the microprocessor based unit 112. Multiple types of removable memory can be provided (illustrated here by a floppy disk 126) and data can be written to any suitable type of removable memory. Memory can be external and accessible using a wired or wireless connection, either directly or via a local or large area network, such as the Internet. Still further, the microprocessor-based unit 112 may be programmed, as is well known in the art, for storing the software program internally. A printer or other output device 128 can also be connected to the microprocessor-based unit 112 for printing a hardcopy of the output from the computer system 110. The microprocessor-based unit 112 can have a network connection 127, such as a telephone line or wireless link, to an external network, such as a local area network or the Internet.

Images may also be displayed on the display 114 via a memory card, such as a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera or a scanner. Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device 128 provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD which can be used in conjunction with any variety of home and portable viewing device such as a "personal media player" or "flat screen TV".

The microprocessor-based unit 112 provides means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect.

The general control computer shown in FIG. 8 can store a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program can also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 8 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web.

In each context, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The cameras disclosed herein have features necessary to practice the invention. Other features are well known to those of skill in the art. In the following, cameras are sometimes referred to as still cameras and video cameras. It will be understood that the respective terms are inclusive of both dedicated still and video cameras and of combination still/video cameras, as used for the respective still or video capture function. It will also be understood that the camera can include any of a wide variety of features not discussed in detail herein, such as, detachable and interchangeable lenses and multiple capture units. The camera can be portable or fixed in position and can provide one or more other functions related or unrelated to imaging. For example, the camera can be a cell phone camera or can provide communication functions in some other manner.

Figure 7:
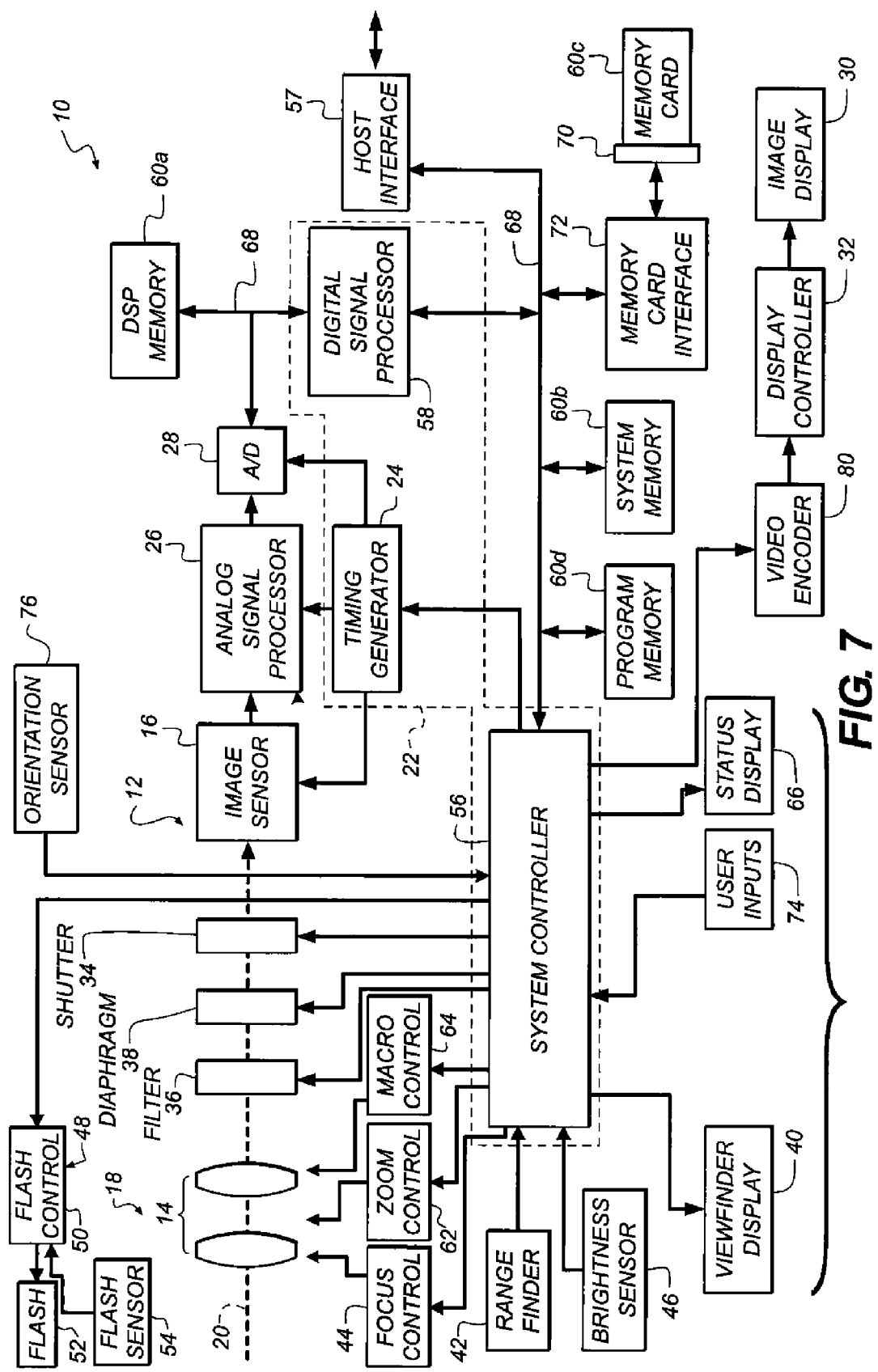
FIG. 7 is a diagrammatical view of an embodiment of the camera of the invention.
Figure 9:
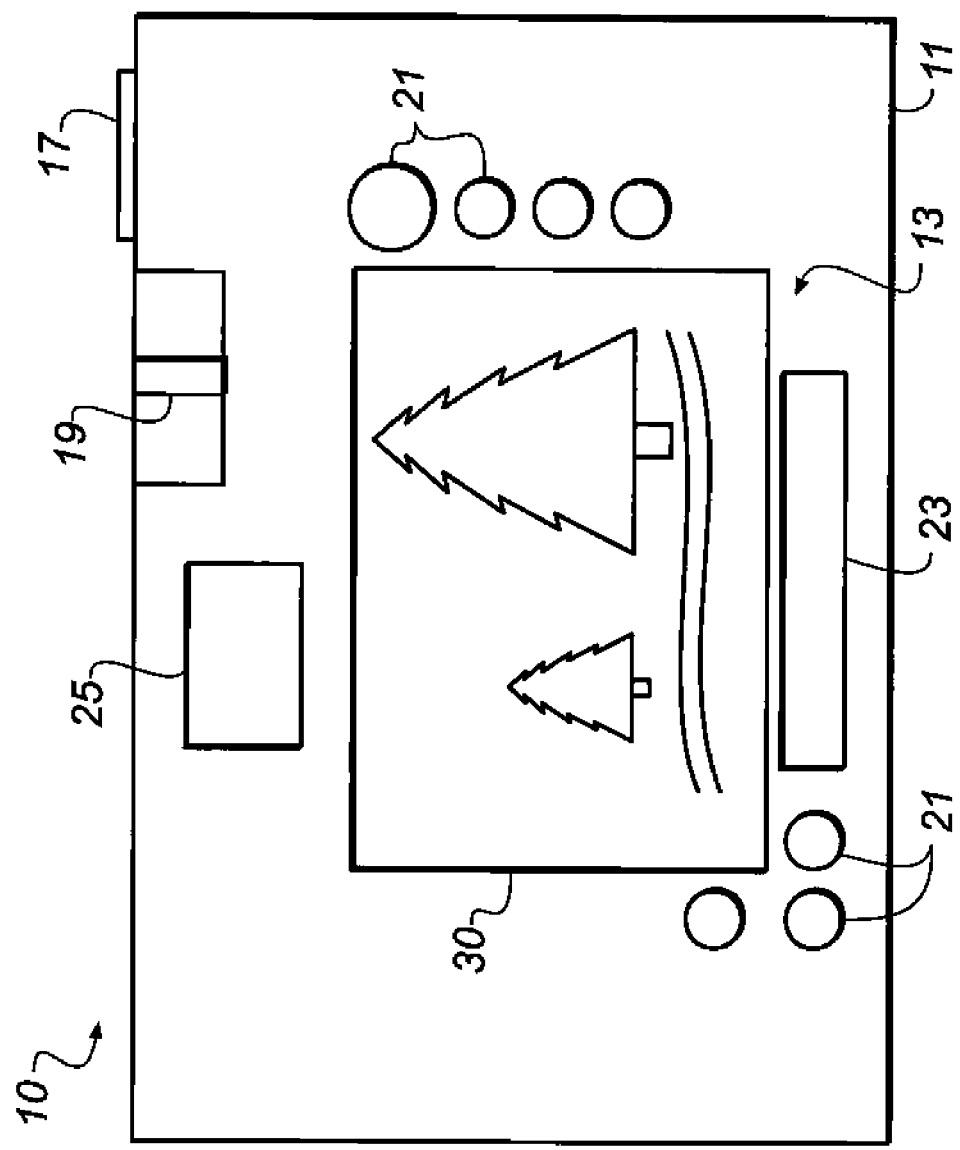
FIG. 9 is a semi-diagrammatical rear view of the camera of FIG. 7.

Referring to FIGS. 7 and 9, in a particular embodiment, the camera 10 has a body 11 that provides structural support and protection for other components. The body 11 can be varied to meet requirements of a particular use and style considerations. An electronic image capture unit 12, which is mounted in the body 11, has a taking lens 14 and an electronic array image sensor 16 aligned with the taking lens 14. The camera 10 has a user interface 13, which provides outputs to the photographer and receives photographer inputs. The user interface 13 includes one or more user input controls (labeled "user inputs" in FIG. 7) and an image display 30. User input controls can include a shutter release 17, a "zoom in/out" control 19 that controls the zooming of the lens units, and other user controls 21. User input controls can be provided in the form of a combination of buttons, rocker switches, joysticks, rotary dials, touch screens, microphones and processors employing voice recognition responsive to user initiated auditory commands, microphones and processors employing voice recognition responsive to user initiated auditory commands, and the like. The user interface can include user reaction tracking features, such as an image sensor, a galvanic response sensor, the above-mentioned microphone. These features can store unanalyzed information for later analysis or a module capable of analyzing user responses and generating appropriate metadata can be included in the user interface. U.S. Patent Publication No. 2003/0128389 A1, filed by Matraszek et al., discusses the generation of metadata from user reaction tracking.

The user interface 13 can include one or more information displays 66 to present camera information to the photographer, such as exposure level, exposures remaining, battery state, flash state, and the like. The image display 30 can instead or additionally also be used to display non-image information, such as camera settings. For example, a graphical user interface (GUI) can be provided, including menus presenting option selections and review modes for examining captured images. Both the image display 30 and a digital viewfinder display (not illustrated) can provide the same functions and one or the other can be eliminated. The camera can include a speaker and/or microphone (not shown), to receive audio inputs and provide audio outputs.

When used as a still camera, the camera 10 assesses ambient lighting and/or other conditions and determines scene parameters, such as shutter speeds and diaphragm settings. A stream of non-archival electronic images are captured in a continuing sequence and displayed to the photographer. The capture of non-archival images ends when the shutter release or trigger 17 is tripped and an archival image is captured. In video capture mode, archival images are captured in a stream as long as the trigger is actuated or toggled on and then off. Many still digital cameras have a two-stroke shutter release. Typically, a partial depression of a shutter button actuates a switch commonly referred to as S1, and full depression of the shutter button actuates a switch commonly referred to as S2. (Full depression is also referred to as "S1-S2 stroke".) A continuous stream of non-archival images is captured at the first stroke and a single archival image is captured at the second stroke.

When the photographer trips the shutter release, light from a subject scene propagates along an optical path 20 through the taking lens 12 strikes the image sensor 16 producing an analog electronic image, which is then digitized and digitally processed. (For convenience, image capture is generally discussed herein in terms of individual still images, like considerations apply to capture of bursts of still images and video sequences.)

The type of image sensor 16 used may vary, but it is highly preferred that the image sensor be one of the several solid-state image sensors available. For example, the image sensor can be a charge-coupled device (CCD), a CMOS sensor (CMOS), or charge injection device (CID). Some components of a control unit 22 work with the image sensor 16. In the illustrated camera, those components are a clock driver (also referred to herein as a timing generator) 24, analog signal processor 26 and an analog-to-digital converter/amplifier (A/D) 28. Such components can also be incorporated in a single unit with the image sensor. For example, CMOS image sensors are manufactured with a process that allows other components to be integrated onto the same semiconductor die.

The electronic image capture unit 16 captures an image with three or more color channels. It is currently preferred that a single image sensor 16 be used along with a color filter, however, multiple monochromatic image sensors and filters can be used. Suitable filters are well known to those of skill in the art, and, in some cases are incorporated with the image sensor 16 to provide an integral component. Those skilled in the art will recognize that some procedures described herein in relation to digital images having multiple color channels can also be limited to one or more of the channels, but less than all of the channels. Suitability of this approach can be determined heuristically.

The image display 30 is driven by an image display driver or controller 32 and produces a light image (also referred to here as a "display image") that is viewed by the user. Different types of image display 30 can be used. For example, the image display can be a liquid crystal display ("LCD"), a cathode ray tube display, or an organic electroluminescent display ("OELD"; also referred to as an organic light emitting display, "OLED"). The display 30 can be mounted on the back or top of the body, so as to be readily viewable by the photographer immediately following a picture taking.

The electrical signal from each pixel of the image sensor 16 is related to both the intensity of the light reaching the pixel and the length of time the pixel is allowed to accumulate or integrate the signal from incoming light. This time is called the integration time or exposure time. Integration time is controlled by a shutter 34, that is switchable between an open state and a closed state. The shutter 34 can be mechanical or electromechanical or can be provided as a logical function of the hardware and software of the electronic image capture unit. For example, some types of image sensors 16 allow the integration time to be controlled electronically by resetting the image sensor and then reading out the image sensor some time later. When using a CCD, electronic control of the integration time of the image sensor 16 can be provided by shifting the accumulated charge under a light shielded register provided at a non-photosensitive region. This can be a full frame as in a frame transfer device CCD or a horizontal line in an interline transfer device CCD. Suitable devices and procedures are well known to those of skill in the art. Thus, the timing generator 24 can provide a way to control when the image sensor is actively recording the image. In the camera of FIG. 7, the shutter 34 and the timing generator 24 jointly determine the integration time.

The combination of overall light intensity and integration time is called exposure. Equivalent exposures can be achieved by various combinations of light intensity and integration time. Although the exposures are equivalent, a particular exposure combination of light intensity and integration time may be preferred over other equivalent exposures for capturing a given scene image. Although FIG. 7 shows several exposure controlling elements, some embodiments may not include one or more of these elements, or there may be alternative mechanisms of controlling exposure. The camera can have alternative features to those illustrated. For example, shutters are well-known to those of skill in the art, that also function as diaphragms.

In the illustrated camera, a filter assembly 36 and diaphragm 38 modify the light intensity at the sensor 16. Each is adjustable. The diaphragm 38 controls the intensity of light reaching the image sensor 16 using a mechanical aperture (not shown) to block light in the optical path. The size of the aperture can be continuously adjustable, stepped, or otherwise varied. As an alternative, the diaphragm 38 can be emplaceable in and removable from the optical path 20. Filter assembly 36 can be varied likewise. For example, filter assembly 36 can include a set of different neutral density filters (not shown) that can be rotated or otherwise moved into the optical path 20.

Referring again to FIG. 7, the camera 10 has an optical system 18 that includes the taking lens 14 and can also include components (not shown) of a viewfinder 25. The optical system 18 can take many different forms. For example, the taking lens 14 can be fully separate from an optical viewfinder or from a digital viewfinder that has an eyepiece (not shown) over an internal viewfinder display 40. The viewfinder and taking lens can also share one or more components. Details of these and other alternative optical systems are well known to those of skill in the art. For convenience, the optical system is generally discussed hereafter in relation to an embodiment having a digital viewfinder including viewfinder display 40 and a separate on-camera display 30 that can be also be used to view a scene, as is commonly done with digital cameras.

The taking lens 14 can be simple, such as having a single focal length and manual focusing or a fixed focus, but this is not preferred. In the camera shown in FIG. 7, the taking lens unit 12 is a motorized zoom lens in which a mobile element or elements are driven, relative to one or more other lens elements, by a zoom drive. This allows the effective focal length of the lens to be changed. Digital zooming (digital enlargement of a digital image) can also be used instead of or in combination with optical zooming. The taking lens can also include elements or groups (not shown) that can be inserted or removed from the optical path, such as to provide a macro (close focus) capability.

The taking lens 14 of the camera is also preferably autofocusing. For example, an autofocusing system can provide focusing passive or active autofocus or a combination of the two. Referring to FIG. 7, an autofocusing system has a rangefinder 42 that sends a signal to the control unit 22 to provide a distance range or ranges for an imaged scene. The control unit 22 does a focus analysis of the signal and then operates a focus driver or control 44 to move the focusable element or elements (not separately illustrated) of the taking lens 14. The functions of the rangefinder 42 can alternatively be provided as software and hardware functions of the capture unit 12.

The camera 10 includes a brightness sensor 46. In FIG. 1, the brightness sensor can be provided, as shown in the form of one or more discrete components. The brightness sensor 46 has a driver (not shown) that operates a single sensor or multiple sensors and provides a signal representing scene light intensity to the control unit 40 for use in the analysis of exposure of the scene. As an option, this signal can also provide color balance information. An example, of a suitable brightness sensor that can be used to provide one or both of scene illumination and color value and is separate from the electronic image capture unit 16, is disclosed in U.S. Pat. No. 4,887,121. The brightness sensor can also be provided as a logical function of hardware and software of the capture unit.

The camera of FIG. 7 includes a flash unit 48 having a flash unit controller 50 (labeled "flash control" in FIG. 7), which has an electronically controlled illuminator 52 (labeled "flash" in FIG. 7) such as a xenon flash tube. A flash sensor 52 can optionally be provided, which outputs a signal responsive to the light sensed from the scene during archival image capture or by means of a preflash prior to archival image capture. The flash sensor signal is used in controlling the output of the flash unit 48 by means of the dedicated flash unit controller 50. As an alternative, the flash unit controller 50 can be eliminated and flash control can be provided as a function of the control unit 22. Flash output can also be fixed or varied based upon other information, such as focus distance. The function of flash sensor 54 and brightness sensor 46 can be combined in a single component or provided as a logical function of the capture unit 12 and control unit 22.

The control unit 22 controls or adjusts the exposure regulating elements and other camera components, facilitates transfer of images and other signals, and performs processing related to the images. The control unit 22 shown in FIG. 7, includes a system controller 56, timing generator 24, analog signal processor 26, A/D converter 28, digital signal processor 58, and memory 60a-60d. Suitable components for the control unit 22 are known to those of skill in the art. These components can be provided as enumerated or by a single physical device or by a larger number of separate components. The system controller 56 can take the form of an appropriately configured microcomputer, such as an embedded microprocessor having RAM for data manipulation and general program execution. Modifications of the control unit 22 are practical, such as those described elsewhere herein.

The timing generator 24 supplies control signals for all electronic components in timing relationship. Calibration values for the individual camera 10 are stored in a calibration memory (not separately illustrated), such as an EEPROM, and supplied to the system controller 56. The components of the user interface are connected to a control unit 22 and function by means of a combination of software programs executed on the system controller 56. The control unit 22 also operates the other components, including drivers and memories, such as the zoom control 62, focus control 44, macro control 64, display drivers 32, and other drivers (not shown) for the shutter 34, diaphragm 36, filter assembly 38, and viewfinder and status displays 40,66.

The camera 10 can include other components to provide information supplemental to captured image information. An example of such a component 76 is the orientation sensor illustrated in FIG. 7. Other examples include a real time clock, a global positioning system receiver, and a keypad or other entry device for entry of user captions or other information.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

The captured electronic image from the image sensor is amplified, processed, and converted from analog to digital by the analog signal processor 26 and A/D converter 28. The resulting digital electronic image is then processed in the digital signal processor 58, using DSP memory 60a and following processing, is stored in system memory 60b and/or removable memory 60c. Signal lines, illustrated as a data bus 68, electronically connect the image sensor 16, system controller 56, processor 58, image display 30, memory 60a-60d, and other electronic components; and provide a pathway for address and data signals.

"Memory" refers to one or more suitably sized logical units of physical memory provided in semiconductor memory or magnetic memory, or the like. Memory 60a-60d can each be any type of random access memory. For example, memory can be an internal memory, such as, such as SDRAM or Flash EPROM memory, or alternately a removable memory, or a combination of both. Removable memory 60c can be provided for archival image storage. Removable memory can be of any type, such as a Compact Flash (CF) or Secure Digital (SD) type card inserted into a socket 70 and connected to the system controller 56 via memory card interface 72. Other types of storage that are utilized include without limitation PC-Cards, MultiMedia Cards (MMC), or embedded and/or removable Hard Drives.

The system controller 56 and digital signal processor 58 can be controlled by software stored in the same physical memory that is used for image storage, but it is preferred that the system controller 56 and digital signal processor 58 are controlled by firmware stored in dedicated memory 60d, for example, in a ROM or EPROM firmware memory. Separate dedicated units of memory can also be provided to support other functions. The memory on which captured images are stored can be fixed in the camera 10 or removable or a combination of both. The type of memory used and the manner of information storage, such as optical or magnetic or electronic, is not critical. For example, removable memory can be a floppy disc, a CD, a DVD, a tape cassette, or flash memory card or stick. The removable memory can be utilized for transfer of image records to and from the camera in digital form or those image records can be transmitted as electronic signals.

The illustrated camera has multiple processors. Although this partitioning of camera functional control among multiple controllers and processors is typical, these controllers or processors are combined in various ways without affecting the functional operation of the camera. These controllers or processors can comprise one or more digital signal processor devices, microcontrollers, programmable logic devices, or other digital logic circuits. Although a combination of such controllers or processors has been described, it should be apparent that one controller or processor can perform all of the needed functions. All of these variations can perform the same function.

In the illustrated embodiment, digital signal processor 58 manipulates the digital image data in its memory 60*a* according to a software program permanently stored in program memory 60*d* and copied to memory 60*a* for execution during image capture. Digital signal processor 58 executes the software necessary for practicing image processing. The digital image can also be modified in the same manner as in other digital cameras to enhance images. For example, the image can be processed by the digital signal processor to provide interpolation and edge enhancement. The digital processing can provide images with modifications for use as display images on the displays on the camera and archival images with modifications for storage in a particular file structure. For example, to be displayed an image may need to be transformed to accommodate different capabilities in terms of gray scale, color gamut, and white point of the display and the imager and other components of the electronic capture unit. The displayed image may be cropped, reduced in resolution and/or contrast levels, or some other part of the information in the image may not be shown. Modifications related to file transfer, can include operations such as, JPEG compression and file formatting. Enhancements can also be provided in both cases. The image modifications can also include the addition of metadata, that is, image record associated non-image information.

System controller 56 controls the overall operation of the camera based on a software program stored in program memory 60*d*, which can include Flash EEPROM or other nonvolatile memory. This memory 60*d* can also be used to store image sensor calibration data, user setting selections and other data which must be preserved when the camera is turned off. System controller 56 controls the sequence of image capture by directing the macro control 64, flash control 50, focus control 44, and other drivers of capture unit components as previously described, directing the timing generator 24 to operate the image sensor 16 and associated elements, and directing digital signal processor 58 to process the captured image data. After an image is captured and processed, the final image file stored in system memory 60*b* or digital signal processor memory 60*a*, is transferred to a host computer (not illustrated in FIG. 7) via interface 57, stored on a removable memory card 60*c* or other storage device, and displayed for the user on image display 30. Host interface 57 provides a high-speed connection to a personal computer or other host computer for transfer of image data for display, storage, manipulation or printing. This interface can be an IEEE1394 or USB2.0 serial interface or any other suitable digital interface. The transfer of images, in the method, in digital form can be on physical media or as a transmitted electronic signal.

In the illustrated camera 10, processed images are copied to a display buffer in system memory 60*b* and continuously read out via video encoder 80 to produce a video signal. This signal is processed by display controller 32 and/or digital signal processor 58 and presented on image display 30 and can be output directly from the camera for display on an external monitor. The video images are archival in the camera is used for video capture and non-archival if used for viewfinding prior to still archival image capture.

The method and apparatus herein can include features provided by software and/or hardware components that utilize various data detection and reduction techniques, such as face detection, skin detection, people detection, other object detection, essential for interpreting the scene depicted on an image, for example, a birthday cake for birthday party pictures, or characterizing the image, such as in the case of medical images capturing specific body parts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

Referring now to FIG. 1, a scene is imaged with a camera in the three different ways indicated by the blocks: viewfinding 202, image capture 204, and display 206. In viewfinding 202, the scene is presented to the photographer as a light image, by means of an optical viewfinder, digital viewfinder, or camera display and the photographer composes the image record. With the digital viewfinder a light image of a scene is captured and then displayed to produce another light image seen by the photographer. Imaging by the viewfinder is also referred to herein as "viewfinding". In image capture 204, a light image of the scene is directed to the image sensor and captured. In display 206, an earlier captured digital image is presented to the user on one of the camera displays and the user reviews the image record.

User inputs are received 208, 210, 212 concurrent with the imaging 202, 204, 206. The inputs received 208, 210, 212 each define a setting of one of a plurality of operational functions of the camera. Values are assigned to the inputs to provide a set of input values. An image value index is then computed 214, 216, 218.

In FIG. 1, there are three different computation paths 220, 222, 224, which are illustrated extending in a vertical direction. The first path 220 leads from viewfinding 202, through receipt 208 of user inputs and computation 214 of an image value index to step 226, in which the image value index is associated with the imaged scene. The second path 222 leads from image capture 204, though receipt 210 of user inputs and computation 216 of the image value index to step 228, in which the image value index is associated with the captured image. The third path 224 leads from image capture 206, though receipt 212 of user inputs and computation 218 of the image value index to step 230, in which the image value index is associated with the captured image. Optionally, supplemental parameters can be determined 231 and used in the computations 214, 216, 218.

FIG. 1 has a pair of horizontally extending tracks 232, 234. The first track, shown by dashed line arrows 232*a*, 232*b*, illustrates camera usage from viewfinding 202, through image capture 204, to display 206 of the captured image. The second track, shown by dashed arrows 234*a*, 234*b*, illustrates computation 216 of the image value index on the second path 222 using an indication of the image value index of the first path 220 and computation 218 of the image value index on the third path 224 using an indication of the earlier image value indexes. Arrows 232a, 232b, 234a, 234b are dashed to indicate that the connections shown are optional. In others words, the method can include any one of the paths 220, 222, 224 or a pair of paths 220-222 or 222-224 or all three paths 220, 222, 224. Limiting the method to the viewfinding path 220 is not currently preferred, since the image value index produced is associated 226 with a scene that is subject to change. Utilization of the scene-associated image value index with later image capture and display events, presents a risk of inaccuracy.

In the following, the method is discussed in relation to embodiments inclusive of or limited to the second path 222, which is illustrated in detail in FIG. 2. The discussion is also generally directed to image records that are single still images. This is a matter of convenience and it will be understood that like considerations apply to other embodiments.

The image value index is based upon assumption that the effort a user puts into capturing an image record is proportional to the level of interest in that image. The same applies to the efforts a user puts into composing the image record and, immediately following capture, checking that the desired image was obtained. It has been determined that the assumption is often, but not universally correct. The image value index is, thus, not completely accurate. In a minority of cases, the level of user interest will have little or no relationship to the provided image value index. It is expected that the image value index will make use of image records quicker and easier for consumers and other users, despite some inaccuracy, because many image records will have accurate image value indexes and handling of those image records can be expedited on that basis. Since some image records may have inaccurate image value indexes, it is preferred that the user be allowed to intervene before irreversible actions and actions that could be costly. In particular embodiments, image value index of individual image records also changes as the respective image records are utilized. It is assumed that utilized images have more value to a user. Based upon this assumption, changing the image value index with utilization automatically increases the accuracy of respective image value indexes. If desired, provision can also be made to allow users to directly or indirectly modify image value indexes to correct erroneous values.

The scene is imaged by the camera as the user sets up for capture, captures one or more images, and, preferably, as the user reviews the captured images on the camera. It is preferred that the user inputs relate to both set up and capture and, if available, review. Examples of user inputs include: partial shutter button depression, full shutter button depression, focal length selection, camera display actuation, selection of editing parameters, user classification of an image record, and camera display deactuation. The user enters inputs using a plurality of camera user controls that are operatively connected to the capture unit via the control unit. The user controls include user capture controls that provide inputs that set-up the camera for capture. Examples are a capture mode switch and flash status control. The user controls can also include user viewfinder-display controls that operate a viewfinder-display unit for on-camera review of an image or images following capture. The viewfinder-display controls can include one or more user controls for manual user classification of images, for example, a "share" or "favorite" button.

The image value index can be computed immediately following image capture and automatically displayed with an image record or available on demand. In either case, the user has a measure of a just captured image record, which can be used to alert the user when a captured image is unlikely to be acceptable and as an instructional aid. Alternatively, the image value index can be hidden and accessible only use of an access code and password, or the like.

With many digital still cameras, a sequence of digital images is captured preceding each capture of an archival still image. The earlier images (also referred to herein as viewfinder images are generally automatically discarded after use for autoexposure, autofocus, and other set-up functions. The last image in the sequence, the archival still image, is automatically retained in memory unless selectively discarded by the user. In this scenario, the image value index is associated with the archival still image.

If a sequence of images is captured and those images are retained, then a single image value index can be calculated and then associated with those images. With a video sequence, the sequence of images is a single image record. Each of the images in a sequence can alternatively be treated as a separate image record. A single image value index can be provided for an image sequence unless individual images are separated out. In that case the image value index can be cloned and the resulting copies can be assigned to the separated images.

Each user input provides a signal to the control unit of the camera, which defines an operational setting. For example with a particular camera, the user moves an on-off switch to power on the camera. This action places the camera in a default state with a predefined priority mode, flash status, zoom position, and the like. Similarly, when the user provides a partial shutter button depression, autoexposure and autofocus engage, a sequence of viewfinder images begins to be captured and automatic flash set-up occurs.

The inputs for a particular image record can be limited to those received during composition, capture, and, optionally, during viewing of that image record. Alternatively, one or more inputs concurrent with composition, capture, and, optionally, viewing of one or more other image records can also be included. For example, if several images are taken of the same scene or with slight shifts in scene (for example, as determined by a subject tracking autofocus system and the recorded time/date of each image), then input values for S2 actuation of all of the images could be included in the input value sets of all of the images.

The control unit has a value module that assigns values to each input and calculates input values dependent upon combinations of inputs. The relationships between particular inputs and resulting input values can be predetermined and can be weighted so as to stress different inputs differently. For example, the input representing powering on the camera can be given a weighting one-half the weighting of any input that changes a setting from a default condition. Weighting can be based upon a preestablished user profile. For example, in such a profile, close-ups could be given twice the weight of images captured at a focus distance of infinity. For convenience, inputs are generally discussed here in relation to an embodiment, in which all inputs are equally weighted.

An example of calculated input values is temporal input values computed from temporal relationships between two or more of the inputs. Temporal relationships can be elapsed times between two inputs or events occurring within a particular span of time. Examples are inputs defining one or more of: image composition time, S1-S2 stroke time, on-camera editing time, on-camera viewing time, and elapsed time at a particular location (determined by a global positioning system receiver in the camera or the like) with the camera in a power on state. Temporal relationships can be selected so as to all exemplify additional effort on the part of the user to capture a particular image or sequence of images. In this case, temporal input values can be scaled as multiples of a unit value assigned to other input values. Temporal input values can also be supplied to a reasoning engine in the same manner as other input values. Geographic relationships between two or more inputs can yield input values in the same manner as temporal relationships as can combinations of different kinds of relationships, such as inputs within a particular time span and geographic range.

The value module computes an image value index (238) using the set of input values of a respective image record. A simplistic approach can simply total equally valued or weighted inputs. It is currently preferred that the image value index is one-dimensional, since this allows simpler comparisons between image records.

In a particular embodiment, the set of input values is supplied to a reasoning engine that has been trained to generate image value indexes. In the reasoning engine, different input values, identified by respective inputs, can compete or reinforce each other according to knowledge derived from the results of the ground truth study of human observers-evaluations of real images. Competition and reinforcement are resolved by the inference network of the reasoning engine. A currently preferred reasoning engine is a Bayes net.

A Bayes net (see, e.g., J. Pearl, *Probabilistic Reasoning in Intelligent Systems*, San Francisco, Calif.: Morgan Kaufmann, 1988) is a directed acyclic graph that represents causality relationships between various entities in the graph, where the direction of links represents causality relationships between various entities in the graph, and where the direction of links represents causality. Evaluation is based on knowledge of the Joint Probability Distribution Function (PDF) among various entities. The Bayes net advantages include explicit uncertainty characterization, efficient computation, easy construction and maintenance, quick training, and fast adaptation to changes in the network structure and its parameters. A Bayes net consists of four components:

(1) Priors: The initial beliefs about various nodes in the Bayes net.
(2) Conditional Probability Matrices (CPMs): Expert knowledge about the relationship between two connected nodes in the Bayes net.
(3) Evidences: Observations from feature detectors that are input to the Bayes net.
(4) Posteriors: The final computed beliefs after the evidences have been propagated through the Bayes net.

The most important component for training is the set of CPMs, because they represent domain knowledge for the particular application at hand. While the derivation of CPMs is familiar to a person skilled in using reasoning engines such as a Bayes net, the derivation of an exemplary CPM will be considered later in this description.

There is one Bayes net active for each image record. It is expected that a simple two-level Bayes net can be used in the current system, where the image value index is determined at the root node and all the inputs are at the leaf nodes. It should be noted that each link is assumed to be conditionally independent of other links at the same level, which results in convenient training of the entire net by training each link separately, i.e., deriving the CPM for a given link independent of others. This assumption is often violated in practice; however, the independence simplification makes implementation simpler and some inaccuracy can be tolerated. It also provides a baseline for comparison with other classifiers or reasoning engines, such as a Bayes net with more than two levels.

All the inputs are integrated by a Bayes net to yield the image value index. On one hand, different inputs may compete with or contradict each other. On the other hand, different inputs may mutually reinforce each other according to prior models or knowledge of typical photographic scenes. Both competition and reinforcement are resolved by the Bayes net-based inference engine.

One advantage of Bayes nets is each link is assumed to be independent of links at the same level. Therefore, it is convenient for training the entire net by training each link separately. In general, two methods are used for obtaining CPM for each root-feature node pair:

(1) Using Expert Knowledge
This is an ad-hoc method. An expert is consulted to obtain the conditional probabilities of each feature detector producing a high or low output given a highly appealing image.
(2) Using Contingency Tables
This is a sampling and correlation method. Multiple observations of each feature detector are recorded along with information about the emphasis or appeal. These observations are then compiled together to create contingency tables which, when normalized, can then be used. This method is similar to neural network type of training (learning).

Other reasoning engines may be employed in place of the Bayes net. For example, in Pattern Recognition and Neural Networks by B. D. Ripley (Cambridge University Press, 1996), a variety of different classifiers are described that can be used to solve pattern recognition problems, where having the right feature is normally the most important consideration. Such classifiers include linear discriminant analysis methods, flexible discriminants, (feed-forward) neural networks, non-parametric methods, tree-structured classifiers, and belief networks (such as Bayesian networks). It will be obvious to anyone of ordinary skill in such methods that any of these classifiers can be adopted as the reasoning engine for practice of the present invention.

Supplemental parameters can also be determined during the imaging and can be used to modify (240) the image value index either after calculation or by modifying particular input values. The modification approach can be simple or complex, as needed. In a simplified example, each input is given a value of one and each supplemental parameter having a predetermined value or reaching a predetermined threshold, is likewise given a value of one; and the image value index is a total. As another example, actuation of a share button during the on-camera display of an image can be treated as a supplemental parameter that changes an image value index to a maximum value or other predetermined value evidencing the user's interest. Supplemental parameters can also be treated as inputs to a reasoning engine or other algorithm in the same manner as the input values. Examples of supplemental parameters include: user reactions, image quality, image content, metadata based information, and information derived from other parameters exclusive of user inputs.

Figure 5:
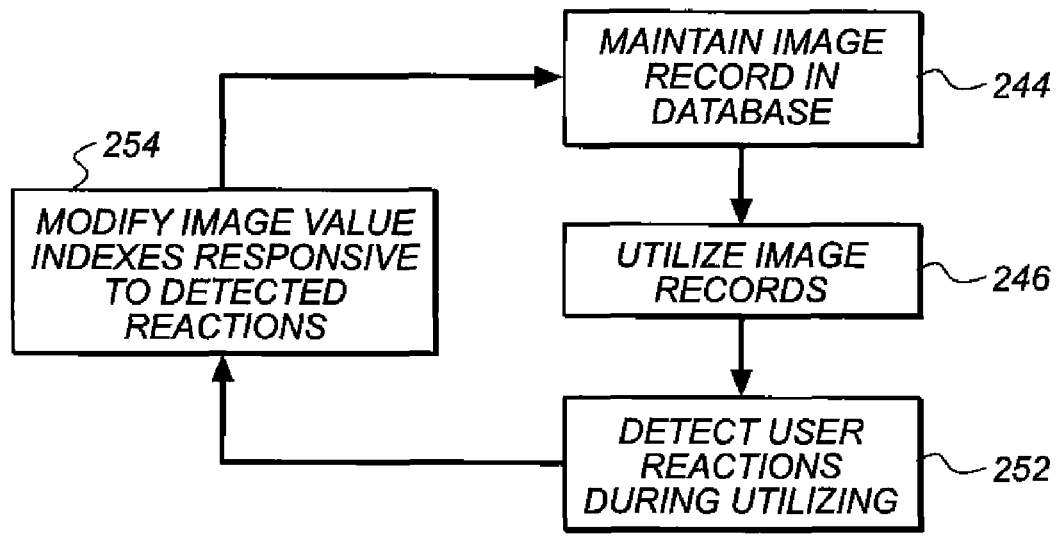
FIG. 5 is a detailed partial flow diagram of still another modification of the method of FIG. 1 showing steps following the path of FIG. 2.

FIG. 5 illustrates a particular embodiment of the invention, in which user reactions are detected (252) during image utilization (246). The User reactions are used to modify (254) image value indexes associated with image records maintained (244) in a database. U.S. Patent Publication No. 2003/0128389 A1, to Matraszek et al., which is hereby incorporated herein by reference, discloses techniques for detecting user reactions to images. (For purposes herein, "user reactions" are exclusive of image usage and of the above-discussed inputs used for camera control.) Examples of user reactions include: vocalizations during viewing, facial expression during viewing, physiological responses, gaze information, and neurophysiological responses. User reactions can be automatically monitored via a biometric device such as a GSR (galvanic skin response) or heart rate monitor. These devices have become low cost and readily available and incorporated into image capture and display device as described in Matraszek et al.

Figure 6:
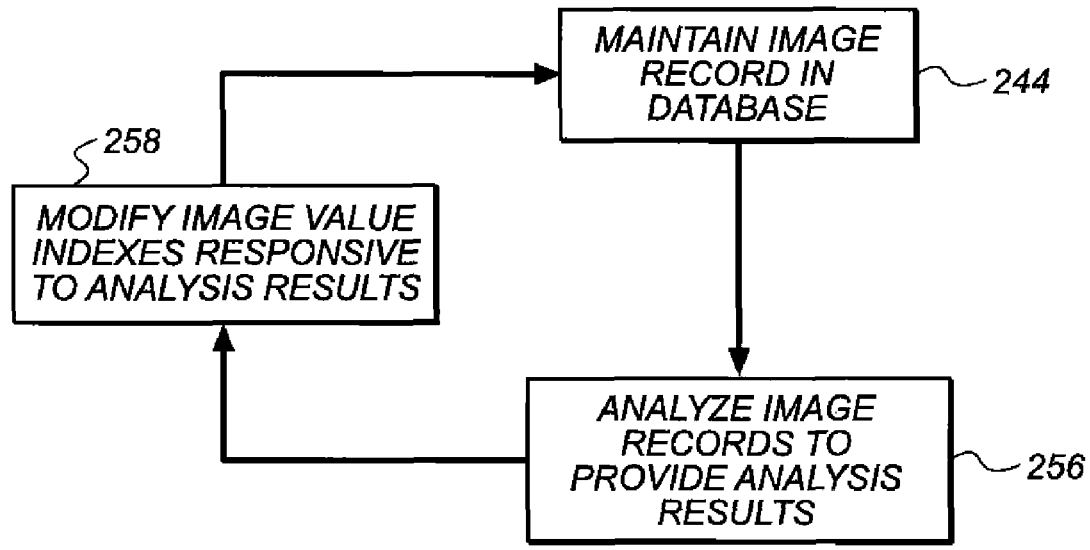
FIG. 6 is a detailed partial flow diagram of yet another modification of the method of FIG. 1 showing steps following the path of FIG. 2.

FIG. 6 illustrates a particular embodiment of the invention, in which image records are analyzed (256) to provide analysis results that are then used to modify (258) image value indexes associated with image records maintained (244) in a database. Image quality and image content can be determined by analysis techniques well known in the art. An analysis of image quality can consider one or more of the factors: image sharpness, image noise, contrast, presence/absence of dark background, scene balance, skin tone color, saturation, clipping, aliasing, and compression state. An analysis of image content can consider one or more of the factors: presence/absence of people, number of people, gender of people, age of people, redeye, eye blink, emotional expression such as for example smile expression, head size, translation problem, subject centrality, scene location, scenery type, and scene uniqueness. ("Translation problem" is defined as an incomplete representation of the main object in a scene, such as a face, or a body of the person.) For example, sunsets can be determined by an analysis of overall image color, as in U.S. Published Patent Application No. US2005/0147298 A1, filed by A. Gallagher et al., and portraits can be determined by face detection software, such as U.S. Published Patent Application US2004/0179719 A1, filed by S. Chen. The analysis of "image content", as the term is used here, is inclusive of image composition. Analysis results for quality can increase or decrease respective image value indexes by predetermined amounts for specific quality factors. For example, a low sharpness value can decrease a respective image value index by a predetermined percentage. Similarly, analysis results showing particular content or particular combinations of content and quality factors can be preassigned specific modifications of the respective image value indexes. For example, the presence of one or more faces could raise an image value index by a predetermined percentage. In the simplified example earlier discussed, in which each input is assigned one point, the presence of a face can add another point to an image value index.

Examples of metadata based information include information derived from textual or vocal annotation that is retained with the image record, location information, current date-time, photographer identity. Metadata can be entered by the user or automatically. Annotations can be provided individually by a user or can be generated from information content or preset information. For example, a camera can automatically generate the caption "Home" at a selected geographic location or a user can add the same caption. Suitable hardware and software for determining location information, such as Global Positioning System units are well known to those of skill in the art. Photographer identity can be determined by such means as: use of an identifying transponder, such as a radio frequency identification device, user entry of identification data, voice recognition, or biometric identification, such as user's facial recognition or fingerprint matching. In other embodiments, photographer identity can be extracted from biometric data themselves using a facial or voice recognition algorithms, as well as fingerprint recognition algorithm matched against identification data stored either in the memory of the camera device or at the central location accessed remotely. Combinations of metadata and other parameters can be used. For example, date-time information can be used in combination with prerecorded identifications of holidays, birthdays, or the like.

Supplemental parameters can be derived from other parameters. Examples of derived information include: compatibility with parameters of a pre-established user profile, a difference or similarity of image content to one or more reference images determined to have a high or low image value index, and combinations of date and location. Clustering can be performed on the image records based upon date-time information, location information, and/or image content. For example, clustering as disclosed in U.S. Published Patent Application No. US2005/0105775 A1 or U.S. Pat. No. 6,993,180 can be used. Results of the clustering can be used as supplemental parameters. Returning to the simplified example, a supplemental parameter of group/non-group can have a value of one for image records within a group boundary with other images and zero for image records beyond the group boundary.

Supplemental parameters can be considered directly or using a predetermined rule set. For example, any images captured during holidays could be adjusted by a preset percentage. Determining interest values of images based upon user reactions is well known in the art.

After capture, an archival image record is stored (242) in memory and an indication of the image value index is associated with the image record. The indication can be recorded in metadata in a digital image file or one of a set of digital image files. The indication can also be stored in a separate file, or within an image of the image record either visibly or by steganographic embedment or the like.

The indication can be in the form of the set of input values, the image value index, or both. The selection of the particular form is a matter of convenience in a particular use. The image value index can be stored as calculated (also referred to here as the "calculated index") or in an alternative form, for example, compressed by Huffman coding. In the following, the image value index is discussed in the form of a calculated index that is stored within the digital file of a respective image record, like considerations apply to other variations.

The indication of the image value index can be associated with an image record in the same manner as other metadata. For example, such indication can be associated with an image record by storing the image value index within a digital image file. This is particularly convenient, if the image record is limited to a single digital file, since this deters accident dissociation of the image value index from the image record. A particular example of metadata within an image file is a TIFF IFD within an Exif image file. Alternatively, image value indexes can be stored separately. Other metadata associated with the image records can be handled in the same manner. Security and access permissions information can be included to control access to the information.

Figure 2:
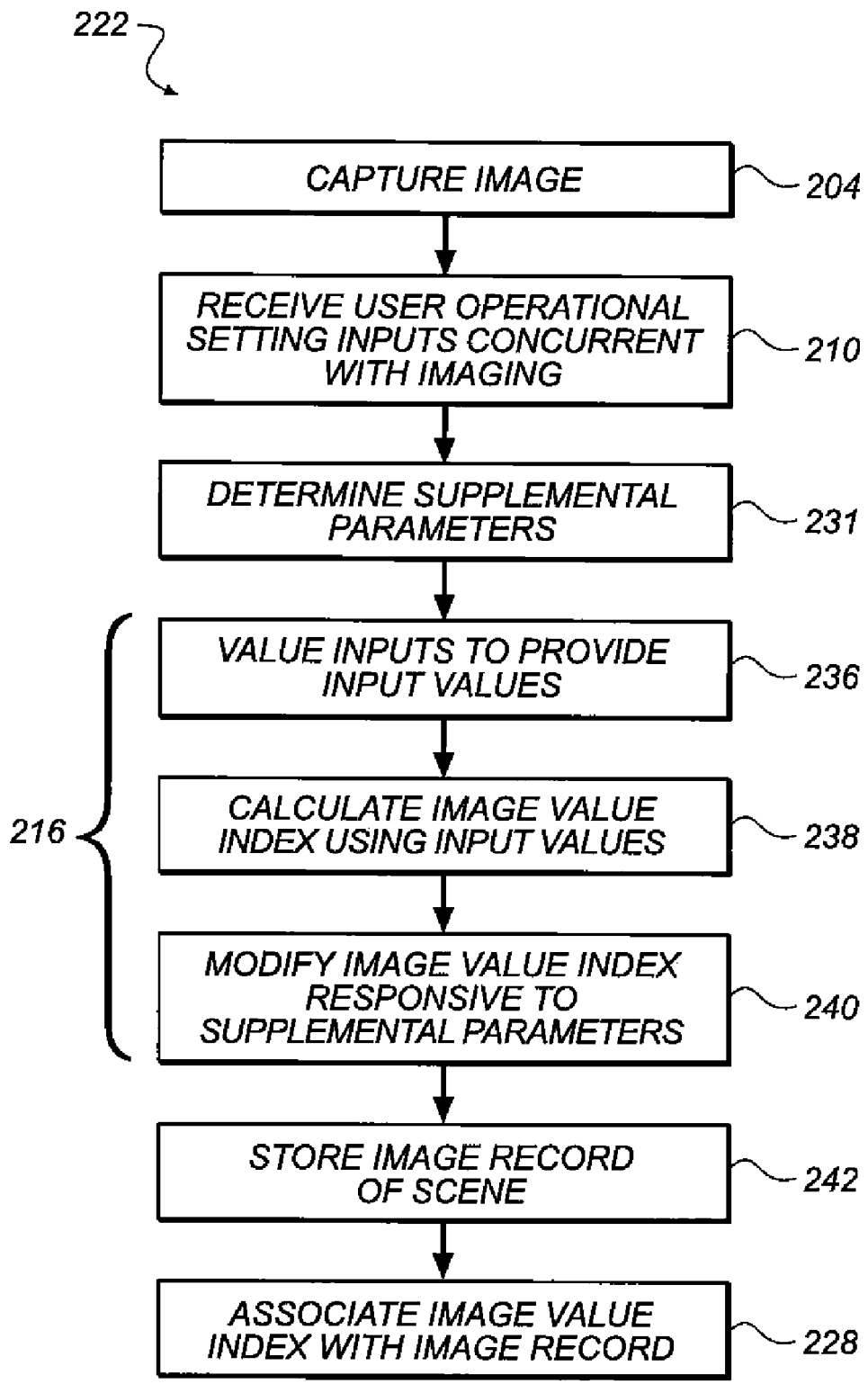
FIG. 2 is a more detailed partial flow diagram of the method of FIG. 1 showing the path from image capture to image value index associated image record.
Figure 3:
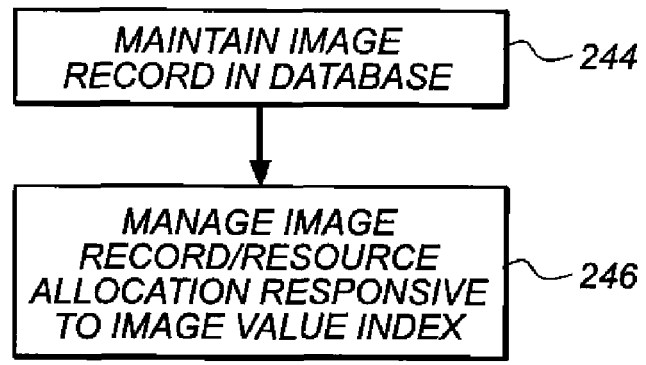
FIG. 3 is a detailed partial flow diagram of a modification of the method of FIG. 1 showing steps following the path of FIG. 2.
Figure 4:
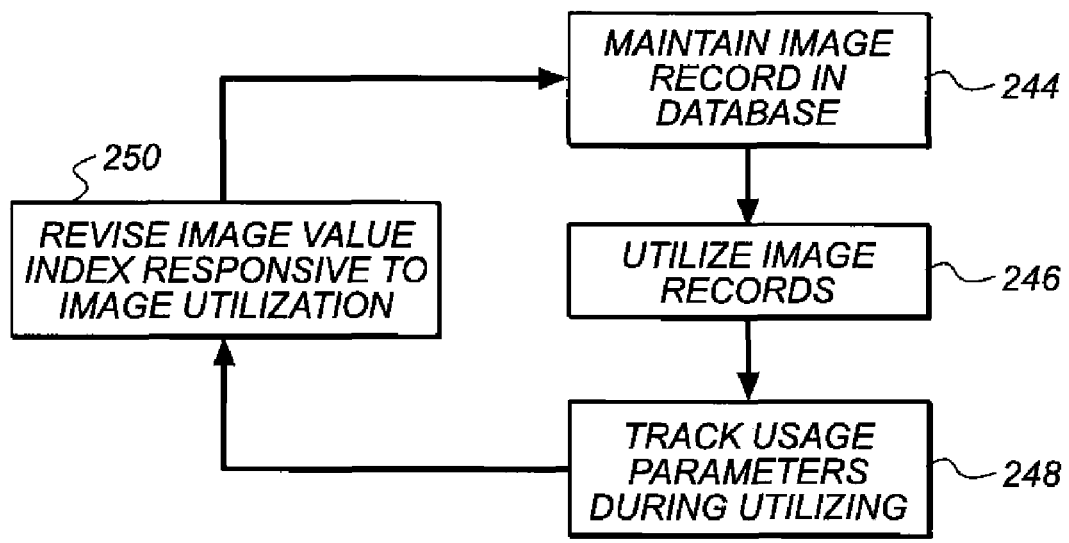
FIG. 4 is a detailed partial flow diagram of another modification of the method of FIG. 1 showing steps following the path of FIG. 2.

Referring now to FIGS. 2-4, after capture, the image records are placed in storage (242) and maintained (244) in a database. The database is in a database unit, which can be a separate device or in the apparatus earlier discussed. The database unit includes a logical and/or physical partition of memory and software and hardware necessary to carry out the functions discussed. The database can be retained in the camera or transferred or copied to a separate database unit that is external to the camera and allows access to the image records and respective image value indexes. The database unit can be in the form of a single component or multiple separated components linked directly or via a network. Suitable hardware, software, file formats, compression/decompression schemes, and other criteria for storing and accessing image records and metadata are well known to those of skill in the art. In a particular embodiment, the database unit is external to the camera and is addressable independent of the camera. This approach is, in some ways not as convenient as a database unit within the camera, but has reduced risk of loss.

Referring to FIG. 4, in a particular embodiment, the stored image records are utilized (246) for one or more purposes, usage parameters of the individual image records are tracked (248), and the image value indexes of the image records are revised (250) responsive to the respective utilization. Examples of utilization include: copying, storage, organizing, labeling, aggregation with other information, image processing, non-image processing computations, hard copy output, soft copy display, and non-image output. Examples of usage parameters include: editing time, viewing time, number of reviews, number of hard copies made, number of soft copies made, number of e-mails including a copy or link to the respective image record, number of recipients of said e-mails, usage in an album, usage in a website, usage as a screensaver, renaming, annotation, archival state, and other fulfillment. Equipment and techniques suitable for image record utilization are well known to those of skill in the art. For example, a database unit that is part of a personal computer can provide output via a display or a printer.

In addition to direct usage information, usage parameters can include values directly comparable to the temporal values earlier discussed. For example, the time viewing and editing specific image records can be considered.

As above noted, additional supplemental parameters of the image records in the database can be evaluated and respective image value indexes modified based upon those evaluations. For example, user reactions can be detected during utilization of image records in the database. Likewise, image value indexes can be modified based upon the image value indexes of similar image records in the database.

The supplemental parameters previously described as being determined in the camera can also be calculated or recalculated in a database unit. For example, if the data used to calculate a particular image value index has been retained, then individual supplemental parameters can be replaced by results from new analyses performed in the database unit. Alternatively, even if the underlying data is unavailable, additional analyses can be performed and the image value indexes modified anyway. It will be understood in that case, that the relative effect of the repeated analyses on the image value indexes will be increased. For example, in the simplified example in which each input has a value of one, a supplemental parameter of quality can be given a value of one if good and zero if poor. In that case, the image value index of a good quality image would be incremented by one unit in the camera and, after a second analysis, by a second unit in the database.

The manner in which the image records are utilized is not critical, except that different usage parameters can be given different weights. The assigned weights can be predetermined based upon a heuristic analysis of the likely relationship between the outputs and the user perception of value of an image.

Image value indexes can be revised by means of a full recalculation, if input values (and temporal values and supplemental parameters, if applicable) are available or can be a modification of the existing image value index. In a continuation of an earlier-discussed simplified example, each utilization of an image record can be assigned a value of one and can be added to the preexisting image value index. Similarly, the image value index of an image record could be raised by a uniform increment at the time of any utilization, and could be lowered by a likewise uniform, negative increment at each passage of a preset time period without utilization.

When individual images in a video sequence or the like are utilized separately, it is convenient to modify respective image value indexes independently. Alternatively, usage of individual images in a video sequence or other related images can be tracked and image value indexes can be modified based upon usage of such similar images.

Referring again to FIG. 3, the image records can also or alternatively be managed (246) using the image value indexes. In this case, the database unit undertakes activities relating to the image records on the basis of respective image value indexes. For example, the activity can be classifying the image records responsive to the respective image value indexes. Classifications provided can be used for searching the image records or other utilization. Other examples of such activities include: queuing of the image records for viewing or other purpose; allocating resources to individual image records; providing output using respective image records; and retaining individual image records in a database unit. Examples of resources to be allocated include logical and physical units providing one or more of: copying, storage, organizing, labeling, aggregation with other information, image processing, non-image processing computations, hard copy output, soft copy display, and non-image output. In a specific example, activities undertaken based upon image value indexes could include: queuing for viewing on a camera display (including optional display in reverse order for easy deletion of bad images), varying compression ratios, and varying retention time in memory. In allocating the resources prioritizations can be given to the image records based upon the image value indexes. For example, image records can be automatically backed-up in remote storage in order of image value index.

Image value indexes can be used to manage access to image records or to limit available functions of image applications. Examples of such functions include allowing or blocking: image modification, distribution, display, printing, and deleting and limiting available modifications, distribution, and output types. With management of this type, it may be desirable to provide hidden image value indexes accessible only to a particular class of users.

Image value indexes can be used to classify image records and then arrange the image records in virtual files, folders, and the like. Icons or other identifying indicia can be determined on the same basis. Automatic file/folder naming conventions can use image value indexes. For example, a convention can have, in order, criteria of user tag/event identification, image content, and image value index based classification. In this case, the system makes a best guess at a file name using available criteria. The user is provided opportunities to override the suggested file/folder name.

If an activity involves performing a common action on multiple image records, then the image value indexes can be considered individually or in the aggregate, for example, by considering the average of the different values. Image value indexes can also be considered in relation to predetermined thresholds. For example, the order of presenting virtual album pages, each bearing multiple images, can be determined by the mean image value index of each page.

As another example of image management, image value indexes of image records can be compared to one or more preset or user selectable value thresholds or thresholds determined from the image records in the database. An example of the latter is the average image value index of a group of image records automatically clustered using a clustering algorithm, such as a k-means algorithm. Image records having image value indexes within a particular threshold can be treated differently that image records within that threshold. For example, image records having an image value index below a minimum acceptable value threshold can be classified as unacceptable and can be deleted or aggressively compressed or the like, either completely automatically or semi-automatically allowing possible user override as to all or individual image records. Similarly, image records having an image value index above a highly acceptable value threshold can be treated preferentially, for example, by inclusion in an automatic slide show of image records, automatically stored redundantly, or made more prominent when presented.

The methods and apparatus are generally discussed here in terms of an embodiment in which each image value index provides the intrinsic value of a particular image. The image value index can alternatively provide a value relative to other images in a collection. The former approach can be particularly advantageous if image records are expected to be moved between different databases or different databases are likely to be combined or split in an unpredictable manner. In that case, repeated recalculation of image value indexes can be avoided. The latter approach can be advantageous if single database is likely to be used and there is a need for repeated comparisons of the image records in the database. For example, when a capacity limit is exceeded, a database unit can automatically request user authorization to delete images based upon relative image value indexes. It is possible to combine both approaches. For example, image records can be assigned intrinsic image value indexes in a camera and later be reassigned corresponding relative image value indexes in a database unit relative to all or a subset of the image records in the database unit.

The image value indexes of a particular set of image records can be based upon information limited to an individual user or can be based upon information from a defined group of people or can be based upon information from a large, and possibly unidentified, group of people, such as viewers of a public web site. The inclusion of more or less people is likely to change resulting image value indexes. For example, usage of a set of image records by a relatively small social group, such as family members, has a good likelihood of being primarily based upon common interests, such as preserving memories; while usage of the same set of image records by a large group of strangers is more likely to be based upon different interests, such as newsworthiness or artistic merit. Since the image value index ordinarily relates to inputs at capture by a single person, the photographer, it is preferred that later modification of resulting image value indexes be limited to a group of persons likely to have the same interests as the photographer. This helps maintain the value of the image value index for the photographer.

With a video sequence, the sequence of images is a single image record. Each of the images in a sequence can alternatively be treated as a separate image record. A single image value index can be provided for an image sequence unless individual images are separated out. In that case the image value index can be cloned and the resulting copies can be assigned to the separated images.

The invention has been described in detail with particular reference to certain preferred embodiments thereof, but it will be understood that variations and modifications can be effected within the spirit and scope of the invention.

The invention claimed is:

1. An imaging evaluation method comprising the steps of:
    imaging a scene with a camera to provide an image record;
    storing the image record in a memory that is an internal, removable, or external non-volatile memory;
    accessing an image record from the non-volatile memory in response to a request in a review mode from an individual user;
    tracking usage parameters of the accessed image responsive to utilization on the camera by the individual user of the accessed image;
    calculating an individual-user image value index for the accessed image using the tracked usage parameters, wherein the image value index corresponds to the value the image record has to the individual user;
    analyzing the accessed image to provide analysis results;
    modifying the calculated individual-user image value index for the accessed image responsive to the analysis results;
    after accessing the stored image, determining a supplemental parameter indicating whether a share user control on the camera has been actuated; and
    modifying the individual-user image value index in response to the supplemental parameter.

2. The method of claim 1 wherein said individual-user image value index is one-dimensional.

3. The method of claim 1, further comprising associating an indication of said individual-user image value index with said image record in a separate file, or within the image record visibly or by steganographic embedment.

4. The method of claim 3 wherein:
    said indication of said individual-user image value index is at least one of (a) said set of input values, and (b) said individual-user image value index; and
    said image record is one of: a still image, a video sequence, and a multimedia record.

5. The method of claim 1, further comprising:
    storing the calculated individual-user image value index in the memory in association with the stored image record,
    repeating the accessing through calculating steps to provide a revised individual-user image value index;
    and storing the revised individual-user image value index of the image record in the memory in association with the stored image record.

6. The method of claim 1, wherein the usage parameters include on-camera editing time and on-camera viewing time.

7. The method of claim 1, wherein one of the tracked usage parameters is on-camera viewing time and the individual-user image value index is calculated using the tracked on-camera viewing time.

8. The method of claim 1, wherein one of the tracked usage parameters is on-camera editing time and the individual-user image value index is calculated using the tracked on-camera editing time.

9. The method of claim 1, wherein the accessed image record is not the just-captured image record.

10. The method of claim 1, wherein the individual user is the photographer who imaged the scene, and further comprising storing information about the identity of the photographer with the stored image record.

11. The method of claim 1, wherein the analyzing determines at least one of: image quality of the accessed image and content of the accessed image.

* * * * *